United States Patent
Guclu et al.

(10) Patent No.: US 12,436,567 B1
(45) Date of Patent: *Oct. 7, 2025

(54) STAND FOR MINI-COMPUTER

(71) Applicant: SARIANA LLC, San Diego, CA (US)

(72) Inventors: Mustafa Burak Guclu, San Diego, CA (US); Alan Turksu, San Diego, CA (US)

(73) Assignee: Sariana LLC, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/044,270

(22) Filed: Feb. 3, 2025

Related U.S. Application Data

(63) Continuation of application No. 18/956,609, filed on Nov. 22, 2024, and a continuation-in-part of application No. 29/971,079, filed on Oct. 31, 2024.

(51) Int. Cl.
*G06F 1/16* (2006.01)

(52) U.S. Cl.
CPC .......... *G06F 1/1632* (2013.01); *G06F 1/1626* (2013.01)

(58) Field of Classification Search
CPC .............................. G06F 1/1632; G06F 1/1626
See application file for complete search history.

(56) References Cited

U.S. PATENT DOCUMENTS

| | | |
|---|---|---|
| D223,304 S | 4/1972 | Doggart et al. |
| D223,914 S | 6/1972 | Adelson et al. |
| D294,231 S | 2/1988 | Cameron et al. |
| D347,212 S | 5/1994 | Riley |
| D362,244 S | 9/1995 | Takemasa |
| D412,160 S | 7/1999 | Nelson |
| D446,209 S | 8/2001 | Hickford et al. |
| D469,098 S | 1/2003 | Otsuka |
| D487,460 S | 3/2004 | Lee |
| D510,566 S | 10/2005 | Johanneck et al. |
| D526,648 S | 8/2006 | Andre et al. |
| D530,717 S | 10/2006 | Mori et al. |
| D537,817 S | 3/2007 | Andre et al. |
| D542,288 S | 5/2007 | Andre et al. |
| D596,626 S | 7/2009 | Andre et al. |
| D601,583 S | 10/2009 | Andre et al. |
| D601,585 S | 10/2009 | Andre et al. |
| D602,891 S | 10/2009 | Luo |
| D604,729 S | 11/2009 | Andre et al. |
| D613,283 S | 4/2010 | Andre et al. |
| D621,397 S | 8/2010 | Andre et al. |
| D631,051 S | 1/2011 | DeFronzo |

(Continued)

OTHER PUBLICATIONS

Mark Sparrow, "Satechi Reveals Stand And Hub For The New Apple Mac Mini M4" Nov. 21, 2024, Forbes.com, Site visited : https://www.forbes.com/sites/marksparrow/2024/11/21/satechi-reveals-stand-and-hub-for-the-new-apple-mac-mini-m4/ (Year: 2024).*

(Continued)

*Primary Examiner* — Nidhi Thaker
(74) *Attorney, Agent, or Firm* — Raymond Wagenknecht

(57) ABSTRACT

A mini-computer stand for use with a mini-computer, the mini-computer having a means for activation on a bottom side, the mini-computer stand including a top configured to accept the mini-computer; and a perimeter that substantially follows a perimeter of the mini-computer; wherein the mini-computer stand further comprises a cutaway positioned to expose the means for activation.

8 Claims, 7 Drawing Sheets

(56) References Cited

U.S. PATENT DOCUMENTS

| | | | |
|---|---|---|---|
| D633,503 S | | 3/2011 | Bo et al. |
| D648,270 S | | 11/2011 | Jiang |
| D650,377 S | | 12/2011 | Akana et al. |
| D657,784 S | | 4/2012 | Akana et al. |
| D660,834 S | * | 5/2012 | Akana .................. D14/314 |
| D667,411 S | | 9/2012 | Kim |
| D705,160 S | | 5/2014 | Ormesher et al. |
| D705,748 S | | 5/2014 | He |
| D718,271 S | | 11/2014 | McTague et al. |
| D719,561 S | | 12/2014 | Akana et al. |
| D726,690 S | | 4/2015 | Andre et al. |
| D738,945 S | | 9/2015 | Culbertson et al. |
| D740,286 S | | 10/2015 | Templeton |
| D750,083 S | * | 2/2016 | Chow .................. D14/434 |
| D756,990 S | * | 5/2016 | Akana .................. D14/314 |
| D757,710 S | | 5/2016 | Donachy et al. |
| D763,262 S | | 8/2016 | Haller et al. |
| D774,934 S | | 12/2016 | Okana et al. |
| D780,137 S | | 2/2017 | Tallqvist |
| D782,476 S | | 3/2017 | Yamazaki |
| D788,034 S | | 5/2017 | Gschwandtl et al. |
| D797,740 S | | 9/2017 | Nguyen |
| D807,840 S | | 1/2018 | Lee et al. |
| D817,199 S | | 5/2018 | Farley et al. |
| D817,287 S | | 5/2018 | Won et al. |
| D821,386 S | | 6/2018 | Dou |
| D828,817 S | | 9/2018 | Odryna et al. |
| D844,006 S | * | 3/2019 | Molnár .................. D14/434 |
| D854,509 S | | 7/2019 | Wu |
| D855,029 S | | 7/2019 | Odryna et al. |
| D855,667 S | | 8/2019 | Shu et al. |
| D859,415 S | | 9/2019 | Liao |
| D864,206 S | | 10/2019 | Wang |
| D865,666 S | | 11/2019 | Roberts |
| D869,426 S | | 12/2019 | Sandlund |
| D872,078 S | | 1/2020 | Wu |
| D872,690 S | | 1/2020 | Williams et al. |
| D874,423 S | | 2/2020 | Wu |
| D875,041 S | | 2/2020 | Chen et al. |
| D876,356 S | | 2/2020 | Tanaka |
| D883,209 S | | 5/2020 | Liao |
| D884,707 S | | 5/2020 | Zhang et al. |
| D887,974 S | | 6/2020 | Chen et al. |
| D890,095 S | | 7/2020 | Liao |
| D893,423 S | | 8/2020 | Nishimura et al. |
| D894,191 S | * | 8/2020 | Turksu .................. D14/356 |
| D901,379 S | | 11/2020 | Choi et al. |
| D906,959 S | | 1/2021 | Turksu et al. |
| D907,043 S | * | 1/2021 | Turksu .................. D14/356 |
| D922,947 S | | 6/2021 | Wang et al. |
| D936,572 S | | 11/2021 | Turksu et al. |
| D936,574 S | | 11/2021 | Turksu et al. |
| D937,764 S | | 12/2021 | Akana et al. |
| D951,955 S | * | 5/2022 | Turksu .................. D14/434 |
| D952,562 S | | 5/2022 | Akana et al. |
| D953,337 S | | 5/2022 | Zhang |
| D958,071 S | | 7/2022 | Yang |
| D966,270 S | * | 10/2022 | Jiang .................. D14/434 |
| D971,835 S | | 12/2022 | Akana et al. |
| D982,546 S | | 4/2023 | Laine et al. |
| D984,991 S | * | 5/2023 | Li .................. D14/314 |
| D993,962 S | | 8/2023 | Turksu et al. |
| D997,946 S | * | 9/2023 | Huang .................. D14/434 |
| D1,030,768 S | | 6/2024 | Liao |
| D1,031,666 S | * | 6/2024 | Zhang .................. D13/147 |
| D1,042,334 S | | 9/2024 | Xu |
| D1,043,566 S | | 9/2024 | Lee et al. |
| D1,043,691 S | | 9/2024 | Liao |
| D1,066,331 S | * | 3/2025 | Turksu .................. D14/434 |
| D1,067,231 S | * | 3/2025 | Zhang .................. D14/434 |
| D1,070,845 S | * | 4/2025 | Akana .................. D14/314 |
| D1,076,921 S | * | 5/2025 | Cai .................. D14/434 |
| 2022/0094201 A1 | | 3/2022 | Haug et al. |
| 2024/0028081 A1 | | 1/2024 | Hyun et al. |

OTHER PUBLICATIONS

Juli Clover, "M4 Mac Mini's Power Button Has New Bottom Location" Oct. 29, 2024, MacRumors.com, Site visited: https://www.macrumors.com/2024/10/29/m4-mac-mini-bottom-power-button/ (Year: 2024).*

* cited by examiner

STAND FOR MINI-COMPUTER

CROSS REFERENCE TO RELATED APPLICATIONS

This is a continuation in part of U.S. patent application Ser. No. 29/971,079, filed Oct. 31, 2024 and is also a continuation of U.S. patent application Ser. No. 18/956,609, filed Nov. 22, 2024; each of which is herein incorporated by reference in its entirety.

TECHNICAL FIELD

The invention relates to a stand for use with a mini-computer, which includes a cutaway that permits access to a control feature(s) positioned underneath the mini-computer

BACKGROUND OF THE INVENTION

In the early days of computing, machines were enormous, filling entire rooms, because they relied on bulky vacuum tubes to process information. However, with advances in microelectronics, including the miniaturization of transistors and improvements in circuit design, computers have shrunk from room-sized mainframes to small, portable mini-computers. Examples of such mini-computers include those offered by APPLE and DELL, having up to many terabyte levels of storage, and multi-core processors, all encased within a housing of about 5-10 inches wide×5-10 inches deep.

On the one hand, decreasing the size of a computer increases its portability and minimizes the real estate needed on one's desk, but on the other hand, it also decreases the available space for adding data ports for connecting peripherals and accessory devices, such as monitors, printers, speakers, microphones, keyboards, a mouse, external memory, as well as other accessories that can be powered from computers such as lights, fans, mobile phone chargers, and more. This is increasingly challenging as computers decrease in size but have expanded capabilities. For example, mini-computers can now pair with multiple monitors, which frequently require multiple large data ports (e.g. HDMI and DP ports), thereby minimizing available space for accessory ports.

One solution to counter the decreasing housing size is to use wireless peripherals/accessories such as wireless keyboards, mouse, and printers. However, wireless signals tend to be slower than signals passing through physical cables, and the installation of wireless transmitters/receivers into peripherals and accessories can add to their cost. Moreover, peripherals and accessories requiring power from the mini-computer are often not suitable for wireless communication.

Another solution is to provide a docking station or hub, which is, in essence, an external multiport adapter. However, docking stations and hubs tend to require additional desk space.

Still another solution is to reposition some features, such as power buttons, reset buttons, and wireless connect buttons, underneath the mini-computer to free up space. However, doing so requires the user to lift the mini-computer to access the feature for activation. Lifting or manipulating the mini-computer to access its underside can require longer cables and can lead to plugs becoming inadvertently unplugged.

Accordingly, there remains a need for a device for use with a mini-computer that increases the number of available data ports, takes up minimal space, and permits the mini-computer itself to use available spacing on its underside without the need for physical lifting and manipulation of the mini-computer to access its underside.

BRIEF SUMMARY OF THE INVENTION

At least some of the above problems are solved in one aspect of the invention by providing a mini-computer stand for use with a mini-computer, where the mini-computer has a means for activation on its bottom side; the mini-computer stand including a top configured to accept the mini-computer; a perimeter that substantially follows a perimeter of the mini-computer; and a cutaway positioned to expose the means for activation.

Most often, the mini-computer stand is rectangular or square with rounded corners. This permits mini-computers that are themselves generally rectangular or square in shape with rounded corners to easily stack on top of the mini-computer stand. However, the mini-computer stand could also have other shapes when appropriate, such as but not limited to elliptical, rounded, triangular, or n-sided, where n is greater than four. By having a perimeter that substantially follows the perimeter of the mini-computer, the footprint of the mini-computer stand can substantially match that of the mini-computer, which economizes on desk space.

Most often, the cutaway removes an upper portion of a corner. In some embodiments, the cutaway removes an upper portion but also extends away from the corner. Alternatively, the cutaway can be remote from all corners depending on the design of the mini-computer. In any event, preferably the cutaway only extends partially downward from the top of the stand so that the cutaway does not extend through the bottom. However, the cutaway could extend fully through the top and bottom of the stand if desired.

Preferably, the mini-computer stand includes data ports that are electrically connected to permit data communication. Most preferably, the data ports permit communication between the mini-computer and auxiliary electronic devices when both are coupled to data ports so that the mini-computer stand can function as a hub for the mini-computer.

In some embodiments, the mini-computer stand includes memory accessible by the mini-computer when connected. In some embodiments, the mini-computer stand includes a solid state drive (SSD).

In a related aspect of the invention a mini-computer stand is provided, which includes a perimeter that is rectangular or square with curved corners, and positioned at one corner is a cutaway that cuts through both the perimeter and top of the mini-computer stand to form a gap or recess that is accessible by both the corner and the top. Here, the cutaway removes an upper portion of the corner. Preferably the cutaway only extends partially downward from the top of the stand so that the cutaway does not extend through the bottom. However, the cutaway could extend fully through the top and bottom of the stand.

Preferably, the mini-computer stand also includes data ports electrically connected to permit data communication. Most preferably, the data ports are configured for communication between the mini-computer and auxiliary electronic devices when both are coupled to data ports so that the mini-computer stand can function as a hub.

In some embodiments, the mini-computer stand includes memory accessible by the mini-computer when connected. In some embodiments, the mini-computer stand includes a solid state drive (SSD).

In another related aspect of the invention, a computer system is provided, which provides a mini-computer stand and a mini-computer. In some embodiments, both the mini-computer and mini-computer stand are rectangular or square with rounded corners, and the cutaway is positioned at one of the corners to access the means for activation, which is positioned on a bottom corner of the mini-computer.

In still another related aspect of the invention, a method for activating a mini-computer is provided, the method including placing the mini-computer on the mini-computer stand so that the means for activation is accessible through the cutaway; and physically contacting the means for activation through the cutaway to initial activation.

BRIEF DESCRIPTION OF THE DRAWINGS

Embodiments of the invention can be better understood with reference to the following drawings, which are part of the specification and represent preferred embodiments. The components in the drawings are not necessarily to scale, emphasis instead being placed upon illustrating the principles of the invention. And, in the drawings, like reference numerals designate corresponding parts throughout the several views.

DETAILED DESCRIPTION OF THE INVENTION

Figure 1:
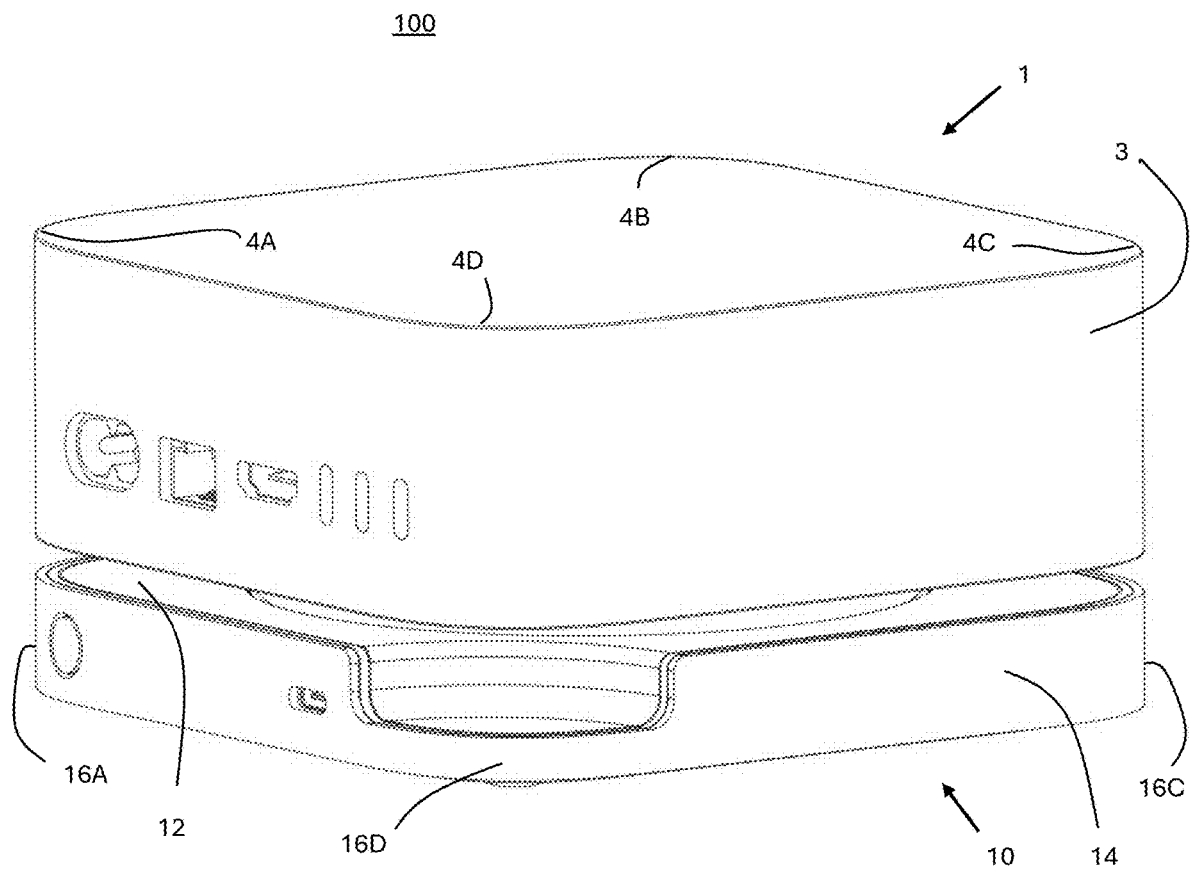
FIG. 1 is a perspective view an exemplary computer system 100 showing a mini-computer 1 being seated on a mini-computer stand 10, where the entirety of the perimeter 14 of the mini-computer stand 10 substantially follows the entirety of the perimeter 3 of the mini-computer 1.
Figure 2:
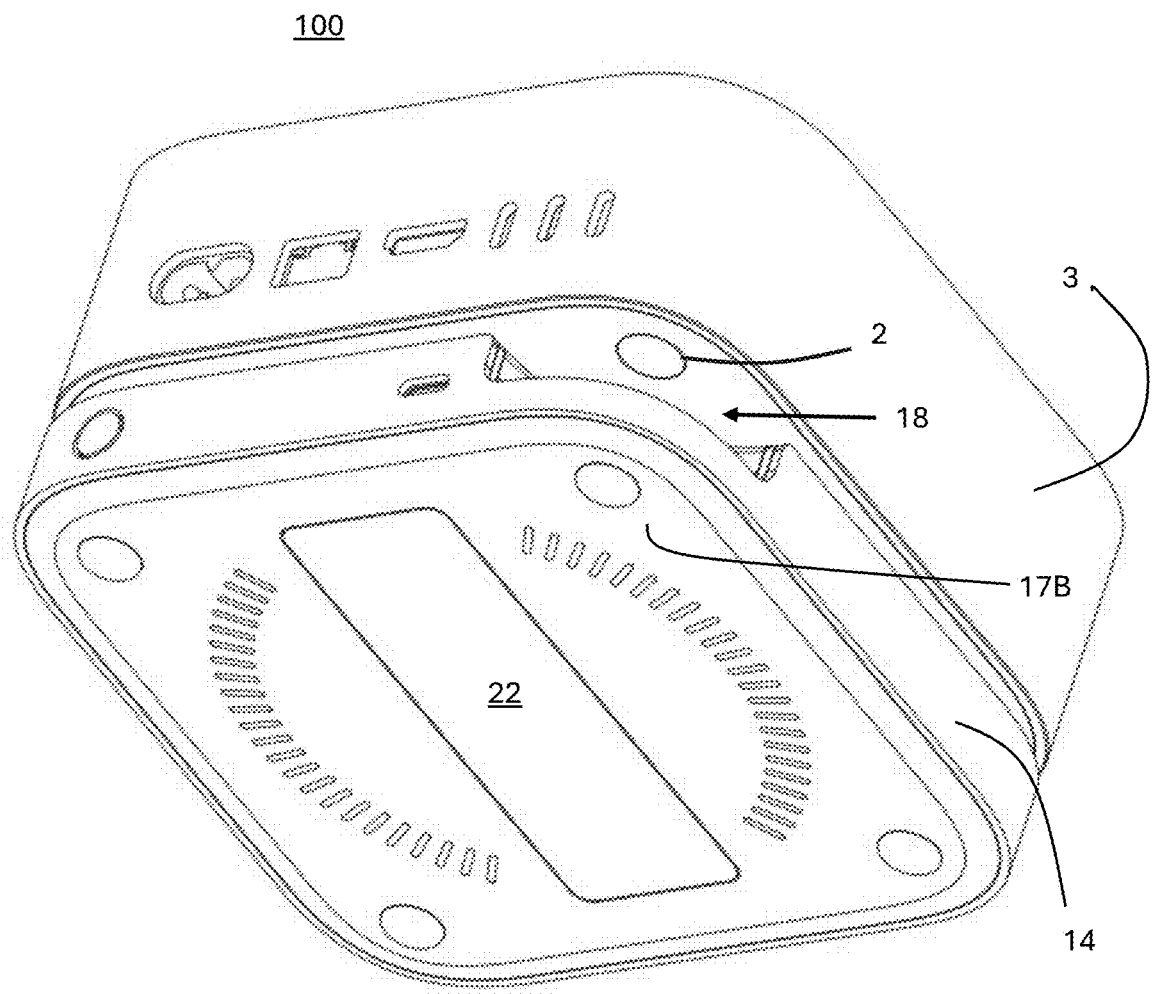
FIG. 2 is a bottom perspective view thereof highlighting a cutaway 18 used to access an exemplary means for activation 2.

Beginning with FIGS. 1-2, the invention includes a mini-computer stand 10 for use with a mini-computer 1, which can be offered separately or together as a system 100. In contrast to large tower computers, as used herein, a "mini-computer" refers to a computer with a relatively small footprint, such as less than about 10 inches wide by less than about 10 inches deep; however the mini-computer 1 is itself a computer and is therefore able to store, receive and process data, such as through the use of memory (RAM/ROM) and a processor. The mini-computer stand 10 is particularly useful for mini-computers 1 having a means for activation 2 on a bottom side or surface. The term "means for activation" as used herein refers to a mechanism, that when activated, initiates a command within the mini-computer 1. Non-limiting examples of a "means for activation" include a power button or switch that turns the mini-computer 1 on or off, a reset button or switch to restart the mini-computer 1, a wireless connection button or switch such as to initiate wireless connection (e.g. BLUETOOTH) with a remote accessory or peripheral such as keyboard, mouse, printer, speakers and/or other devices configured for wireless connection. Though not required, typically, the means for activation will be identified by touch via a contoured surface (e.g. convex or concave) that deviates from the surrounding surface or by a surround that is either raised or recessed.

Figure 3A:
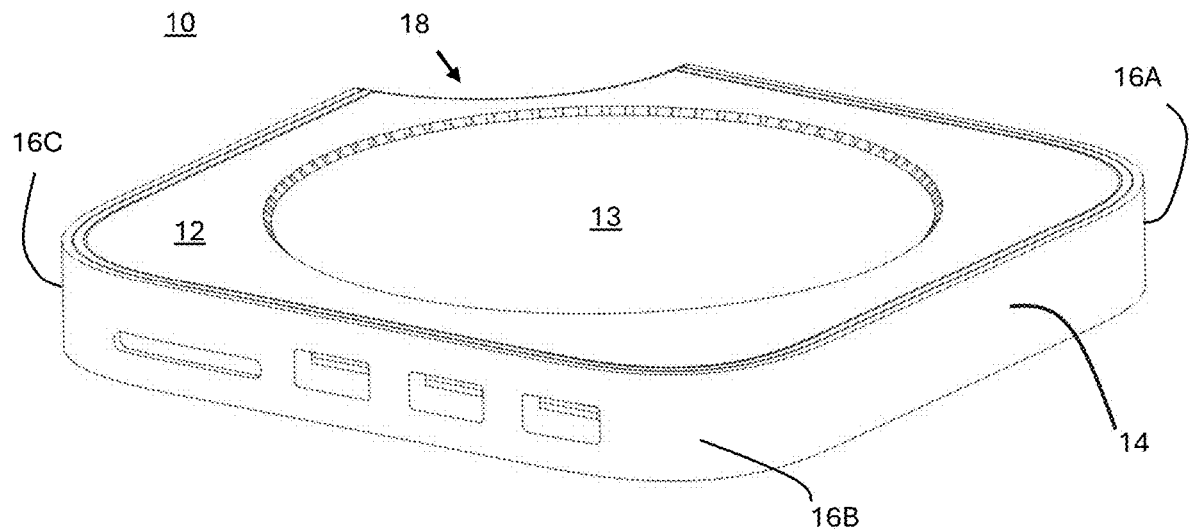
FIG. 3A is a front perspective view of the mini-computer stand 10.

Preferably, the mini-computer stand 10 has a top 12 (seen better in FIGS. 3A-4) configured to accept the mini-computer 1, and a perimeter 14 that substantially follows a perimeter 3 of the mini-computer 1 (see FIG. 1). By "configured to accept the mini-computer" as used herein means that the mini-computer 1 can be seated on top of the mini-computer stand 10. The top 12 can include a recess 13 (see FIGS. 3A-B) or lack a recess (see FIG. 4). By "substantially follows" it is meant that when the mini-computer 1 is seated on the mini-computer stand 10 (see FIGS. 1-2), two or more side walls from each of the mini-computer 1 and mini-computer stand 10, which partially define the perimeters 3, 14, are more or less aligned one above the other so they are offset horizontally less than about 1.5 cm, preferably less than 1 cm, more preferably less than 5 mm, most preferably less than 2 mm way from one another. In some embodiments, the remaining two walls defining the remaining portions of the perimeters 3, 14 can also be more or less aligned one above the other so that they are offset horizontally less than about 1.5 cm, preferably less than 1 cm, more preferably less than 5 mm, most preferably less than 2 mm way from one another. A perimeter 14 that substantially follows a perimeter 3 of the mini-computer 1 all the way around can be seen more clearly in FIGS. 1-2, where both the mini-computer 1 and mini-computer stand 10 are generally square with similarly rounded corners 4A-D, 16A-D (see FIGS. 1, 3A). As such, the footprint of the mini-computer stand 10 can be substantially the same as the mini-computer 1, which as will be described in more detail in paragraphs that follow substantially increases the number of available data ports 5, 20 for use by the mini-computer 1 while simultaneously maintaining space efficiency, namely, minimizing the real estate needed on one's desk for storing the mini-computer 1 and stand 10.

However, in other embodiments, the perimeter 14 of the mini-computer stand 10 extends farther in at least one direction, optionally two, so that an additional feature can be added to the top 12, such as a cell phone charging region, wireless ear plug charging region, or storage region next to a seated mini-computer 1. In such an embodiment, the mini-computer 1 may be generally square with rounded corners 4A-D while the mini-computer stand 10 is rectangular (with longer length) and rounded corners 16A-D.

Figure 3B:
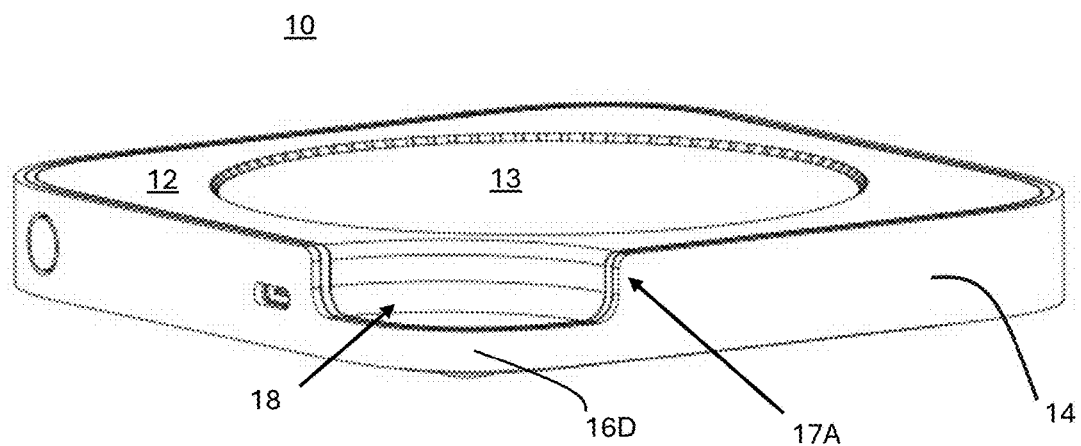
FIG. 3B shows one configuration of a corner cutaway 18.

Shown best in FIGS. 2-3B, among the benefits shared by each of the embodiments described herein is that the mini-computer stand 10 has a cutaway 18 positioned to expose the means for activation 2 positioned on the underside of the mini-computer 1. In most instances, it is envisioned that the cutway 18 will be positioned at a corner 16D, although this could vary depending on the particular mini-computer 1. By providing a cutway 18, access is improved; the user is no longer required to lift or tilt the mini-computer 1 to access the means for activation 2. Since the mini-computer 1 can remain stationary during activation, cable length can also be minimized and the likelihood of inadvertently unplugging a cable from the mini-computer 1 is also minimized.

One having ordinary skill in the art to which the invention belongs will recognize that the cutaway 18 can vary in size and shape but preferably is sufficiently large that an ordinary user can fit a finger within the cutaway 18 and reach the means for activation 2. As general guidance, a cutaway of about 1 inch wide by about 1 inch deep by about one-half inch in height would be appropriate in most instances.

Preferably the cutway 18 is arcuate in shape and in some instances can be an inverse to the arc of a rounded corner 16D. Moreover, the cutaway 18 can be slightly pitched to guide the finger upwards. Each of the above enhances the user experience and improves ergonomics during use.

Figure 3C:
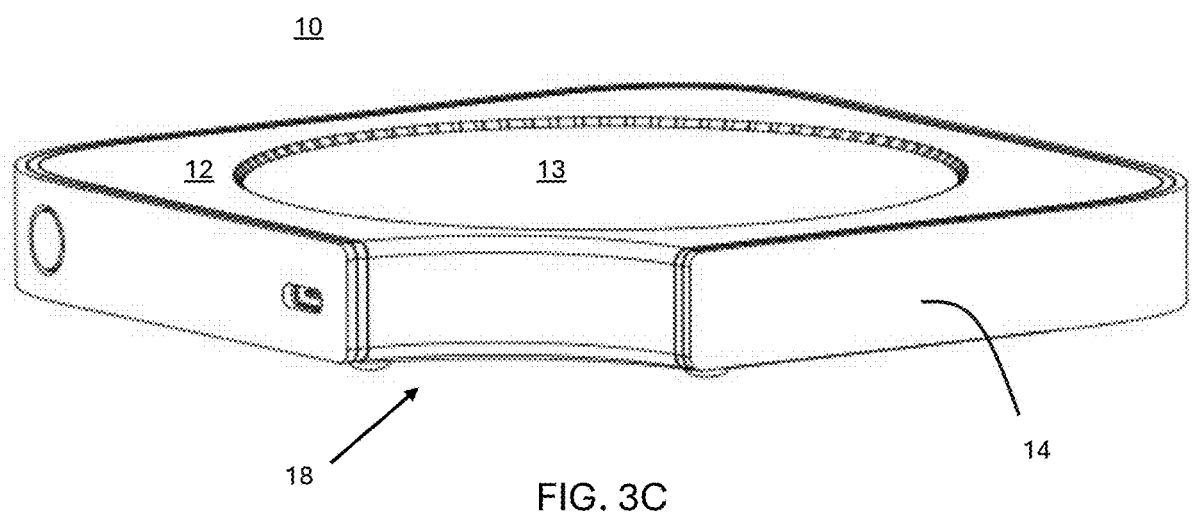
FIG. 3C shows another configuration of a corner cutaway.
Figure 4:
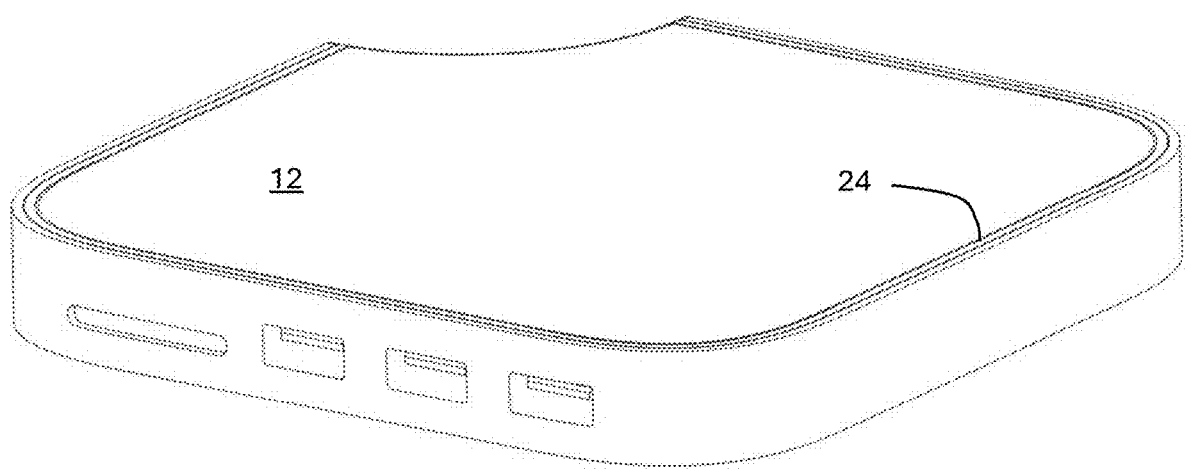
FIG. 4 depicts another variation of the mini-computer stand 10.
Figure 5:
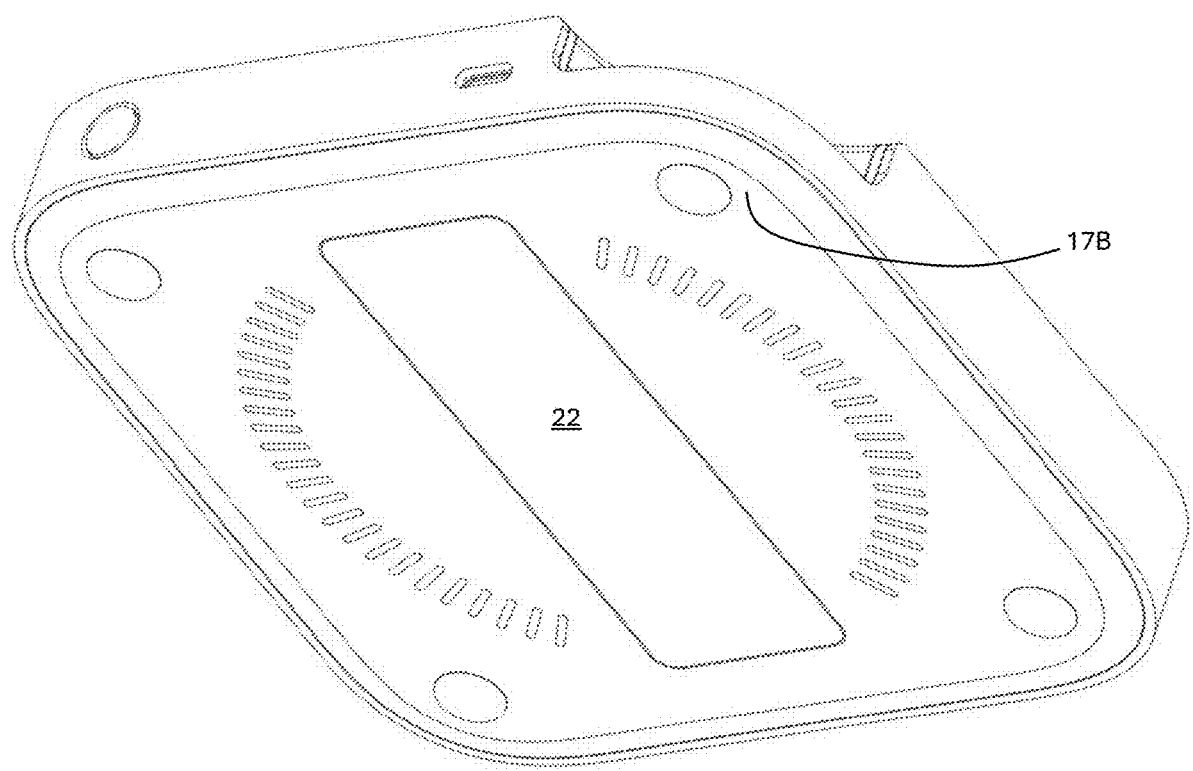
FIG. 5 is a lower perspective view thereof.

Shown best in FIG. 3B and FIG. 5, preferably, the cutaway 18 removes an upper portion 17A of a corner 16D but does not remove material from a bottom 17B of the mini-computer stand 10. Shown best in FIG. 2, this permits access to the means for activation 2 on the one hand but maximizes the dimension of the bottom 17B for sturdiness on the other. Alternatively, as shown in FIG. 3C, the cutaway 18 can extend through the entirety of the height of the mini-computer stand 10 and thus through the bottom 17B.

Figure 6:
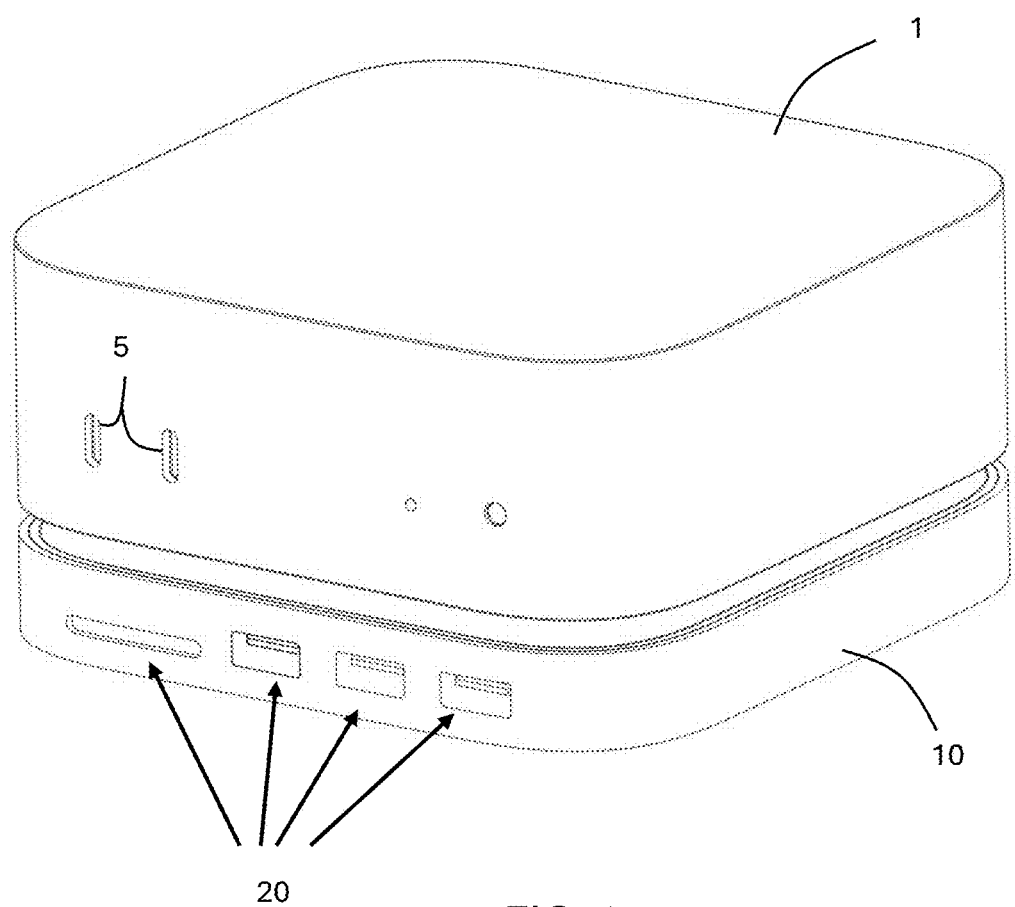
FIG. 6 is a front perspective view of a computer system 100 highlighting the additional data ports 20 provided by the addition of the mini-computer stand 10.

Shown best in FIG. 6, preferably, the mini-computer stand 10 also includes data ports 20 that permit a hardline connection to both the mini-computer 1 and peripherals or electronic accessories and thus expand on available data ports 5, 20 for the mini-computer 1. Nonlimiting examples of data ports 20 can include, but are not limited to, USB, USB-A, USB-C, HDMI, mini HDMI, DisplayPort (DP), mini DisplayPort, Ethernet, Thunderbolt, composite audio/video, component video, optical audio, stereo/headphones, line in, mic, microSD card readers, miniSD card readers, power, and others. The presence of data ports 20 permits the mini-computer stand 10 to act as a hub for connecting and optionally powering peripherals and accessories to the mini-computer 1, such as but not limited to, monitors, printers, speakers, microphones, keyboards, a mouse, external memory as well as other accessories that can be powered from computers such as LED lights, fans, and more.

Shown best in FIG. 2 and FIG. 5 the mini-computer stand 10 can also include additional memory or data storage 22, such as a solid state drive (SSD) for use by the mini-computer 1. Alternatively or in addition, the computer mini-stand 10 can also include lighting 24 (see FIG. 4).

Returning to FIGS. 1-2, while the invention has been described primarily as a mini-computer stand 10 for use with a mini-computer 1, a computer system 100 is also encompassed which includes a mini-computer stand 10 and mini-computer 1. In some embodiments, both the mini-computer 1 and mini-computer stand 10 are rectangular or square with rounded corners 16A-D, and the cutaway 18 is positioned at one of the corners 16D to access the means for activation 2, which is positioned on a bottom corner of the mini-computer 1.

Likewise, also provided is a method for activating a mini-computer 1, which includes providing the computer system 100 (or mini-computer 1 and mini-computer stand 10 separately); placing the mini-computer 1 on the mini-computer stand 10 so that the means for activation 2 is accessible through the cutaway 18; and physically contacting (e.g. pressing, switching) the means for activation 2 through the cutaway 18.

The invention described in the above exemplary embodiments, may be embodied in other specific forms without departing from the spirit or essential characteristics thereof. The specific embodiments previously described are therefore to be considered as illustrative of, and not limiting, the scope of the invention.

What is claimed is:

1. A mini-computer stand for use with a mini-computer that has a square perimeter with rounded corners, the mini-computer stand comprising:
a top configured for placement of the mini-computer; and
a perimeter that is square with a plurality of rounded corners, wherein a back corner from the plurality of rounded corners of the mini-computer stand comprises a cutaway in top and side portions of the back corner that does not extend through a bottom side of the mini-computer stand, which is adapted to expose a corresponding back bottom portion of the mini-computer through the cutaway when the mini-computer is placed on the top of the mini-computer stand.

2. The mini-computer stand of claim 1, further comprising data ports on a front side of the mini-computer stand to form a hub, wherein the front side is opposite a back side of the mini-computer stand that includes the back corner.

3. The mini-computer stand of claim 2, wherein the front side of the mini-computer stand comprises a USB data port.

4. The mini-computer stand of claim 1, further comprising a front side and an opposite back side that includes the back corner; and a data port on the front side and another data port on the back side of the mini-computer stand to form a hub.

5. The mini-computer stand of claim 1, wherein:
the back corner has a) a first height that defines a beginning of the cutaway in the side portions and b) a second height that defines an end of the cutaway in the side portions;
the mini-computer stand has a stand height that is a sum of the first height and the second height; and
the second height is greater than the first height.

6. The mini-computer stand of claim 1, wherein the back corner comprises a horizontally curved surface that defines the cutaway in the top and the side portions of the back corner.

7. The mini-computer stand of claim 1, further comprising a plurality of feet coupled to the bottom side of the mini-computer stand that is opposite the top.

8. A computer system comprising the mini-computer and the mini-computer stand of claim 1, wherein the mini-computer comprises the perimeter that is square with rounded corners, further wherein the perimeters of the mini-computer and the mini-computer stand are substantially the same size so that when placed on the mini-computer stand, the mini-computer stand enables access to the back bottom portion of the mini-computer through the cutaway.

* * * * *